United States Patent
Hans

(10) Patent No.: US 11,595,807 B2
(45) Date of Patent: *Feb. 28, 2023

(54) ROAMING CONTROL

(71) Applicant: IPCOM GMBH & CO. KG, Pullach (DE)

(72) Inventor: Martin Hans, Bad Salzdetfurth (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,119

(22) Filed: Feb. 23, 2022

(65) Prior Publication Data
US 2022/0182811 A1     Jun. 9, 2022

Related U.S. Application Data

(63) Continuation of application No. 16/345,536, filed as application No. PCT/EP2018/053419 on Feb. 12, 2018, now Pat. No. 11,297,487.

(30) Foreign Application Priority Data

Feb. 10, 2017   (EP) .................................... 17155624

(51) Int. Cl.
    *H04W 8/12*      (2009.01)
    *H04W 76/50*     (2018.01)
    (Continued)

(52) U.S. Cl.
    CPC .............. *H04W 8/12* (2013.01); *H04W 48/04* (2013.01); *H04W 76/50* (2018.02); *H04W 84/042* (2013.01)

(58) Field of Classification Search
    CPC . H04W 36/0072; H04W 24/10; H04W 36/14; H04W 36/0033; H04W 48/18;
    (Continued)

(56) References Cited

U.S. PATENT DOCUMENTS 7,149,524 B2   12/2006  Reynolds
7,292,592 B2   11/2007  Rune
              (Continued)

FOREIGN PATENT DOCUMENTS

CN       104662967 A    5/2015
EP         2709389 A1   3/2014
              (Continued)

OTHER PUBLICATIONS

International Search Report for International Application No. PCT/EP2018/053419, dated Apr. 16, 2018.
(Continued)

*Primary Examiner* — Jung Liu
(74) *Attorney, Agent, or Firm* — Marshall, Gerstein & Borun LLP

(57) ABSTRACT

The invention provides a method performed by a home public land mobile network, PLMN, of controlling access of a user equipment, UE, device to a non-home PLMN when the UE device has an access to a non-trusted network and thereby a connection with the home PLMN via an interworking function entity, the method comprising in the event of the UE device requesting an attachment to the non-home PLMN, making in the home PLMN a decision as to whether control of the UE device should be handed over to the non-home PLMN; and communicating the decision to the non-home PLMN.

15 Claims, 4 Drawing Sheets

(51) Int. Cl.
*H04W 48/04* (2009.01)
*H04W 84/04* (2009.01)

(58) Field of Classification Search
CPC ......... H04W 4/22; H04W 48/08; H04W 4/90; H04W 72/04; H04M 15/8038; H04M 2215/34; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | |
|---|---|---|---|
| 2012/0164979 A1 | 6/2012 | Bachmann et al. | |
| 2013/0225120 A1* | 8/2013 | Hietalahti | H04W 36/00835 455/404.2 |
| 2014/0038592 A1 | 2/2014 | Hietalahti | |
| 2014/0073320 A1 | 3/2014 | Dhanda et al. | |
| 2014/0228034 A1* | 8/2014 | Gao | H04W 36/0072 455/437 |
| 2015/0031371 A1* | 1/2015 | Zhao | H04W 36/14 455/439 |
| 2015/0304937 A1 | 10/2015 | Kim et al. | |
| 2015/0351023 A1* | 12/2015 | Basavaraj | H04W 48/08 455/434 |
| 2016/0066235 A1* | 3/2016 | Bhat | H04W 36/14 455/436 |
| 2017/0142566 A1* | 5/2017 | Lin | H04W 4/90 |
| 2017/0142648 A1* | 5/2017 | Jiang | H04W 48/18 |
| 2017/0303259 A1* | 10/2017 | Lee | H04W 28/16 |
| 2018/0103363 A1* | 4/2018 | Faccin | H04W 8/005 |
| 2018/0139661 A1* | 5/2018 | Kumar | H04W 8/22 |
| 2018/0167983 A1* | 6/2018 | Salkintzis | H04W 76/15 |
| 2018/0310162 A1* | 10/2018 | Kim | H04W 12/69 |
| 2018/0376445 A1* | 12/2018 | Yoon | H04W 60/06 |
| 2019/0037516 A1* | 1/2019 | Kim | H04W 60/005 |
| 2019/0215691 A1* | 7/2019 | Salkintzis | H04W 12/069 |
| 2019/0357129 A1* | 11/2019 | Park | H04W 60/04 |
| 2020/0154352 A1* | 5/2020 | Baek | H04W 48/06 |

FOREIGN PATENT DOCUMENTS

| | | |
|---|---|---|
| JP | 2003-522490 A | 7/2003 |
| JP | 2012-531770 A | 12/2012 |
| WO | WO-2015/126999 A1 | 8/2015 |
| WO | WO-2016180865 A1 | 11/2016 |

OTHER PUBLICATIONS

"Roaming UE connected over WLAN through N3IWF in HPLMN", LG Electronics, vol. SA WG2, no. Spokane, WA, USA; URL: http://www.3gpp.org/ftp/meetings_3GPP_SYNC/SA2/Docs/, pp. 1-2; figure 1, Jan. 16, 2017.
Written Opinion for International Application No. PCT/EP2018/053419, dated Apr. 16, 2018.
"3rd Generation Partnership Project; Technical Specification Grou Services and System Aspects; System Architecture for the 5G System; Stage 2 (Release 15)", Feb. 6, 2017.
"3rd Generation Partnership Project; Technical Specification Group Services and System Aspects; Procedures for the 5G System; Stage 2; (Release 15)", Jan. 26, 2017.
Notice of Reasons for Refusal for Japanese Patent Application No. 2018-556827, dated Mar. 2, 2021.
Decision to Grant a Patent for Japanese Patent Application No. 2018-556827, dated May 10, 2021.
Office Action issued in Application No. IN 201817040713, Intellectual Property India, dated Nov. 9, 2021.

* cited by examiner

ROAMING CONTROL

CROSS-REFERENCE TO RELATED APPLICATIONS

This is a Continuation of U.S. patent application Ser. No. 16/345,536 filed Apr. 26, 2019, which is the United States national phase of International Patent Application No. PCT/EP2018/053419, filed Feb. 12, 2018, which claims priority to European Patent Application No. 17155624.4, filed Feb. 10, 2017, the entire contents of each of which are hereby incorporated by reference.

FIELD OF THE DISCLOSURE

The present invention relates to a method of controlling roaming of a user equipment, UE, device.

BACKGROUND

A UE device generally has a home network, often referred to as a home public land mobile network, PLMN, and may roam into a geographical area covered by a second network, often referred to as a visited PLMN. In addition to connections to these networks, the UE device may form a connection to an untrusted network such as a WLAN using for example hotspots and the like.

At the present time, standards bodies are concerned with defining a so-called fifth generation, or 5G, cellular communications network. The 5G core network (CN) architecture is not yet fixed in the standardization procedure but various functions and interconnections between functions can be expected to be present in the finalized architecture. FIG. 1 shows a CN architecture for 5G as currently discussed in 3GPP. It is very similar to the core network architecture of the 4G system called Enhanced Packet System (EPS) or Enhanced Packet Core (EPC).

Cellular mobile networks in general consist of access networks and a core network as shown in FIG. 1. The access networks ((R)AN) provide mainly cellular radio access to a mobile device, e.g. via GSM, UMTS or LTE. Additional access networks may provide access via short range radio access, e.g. WLAN, or fixed or satellite access to mobile or fixed devices shown in FIG. 1 in an exemplary manner as a wireless local area network (WLAN). The access networks usually provide the complete functionality to setup, control and maintain radio connections to devices.

The core network provides mechanisms that are not access specific, e.g. authentication, authorization and accounting (AAA) of devices and/or subscribers, mobility between access networks and routing between the access networks and external data networks.

A UE in general accesses the 3GPP CN through an access network that may be a radio access network (R)AN. If the radio access network is defined by 3GPP, e.g. the newly defined 5G radio access network, the network nodes are operated by a mobile network operator and they are considered as trusted. Then the access network provides a direct connection to an access and mobility function (AMF). The connection is named NG2. The AMF, as for all the elements depicted in FIG. 1, may be present multiple times in a single CN. An AMF is usually selected for a UE at registration of a UE in the network and only one AMF is responsible for a single UE at a time. The AMF, as all elements of the CN, can communicate to other CN elements through respective interfaces. The AMF for example connects to a user data management (UDM) to receive information about the subscriber and subscribed services and to the authentication server function (AUSF) to authenticate a UE at registration and to get security credentials used for communication with the UE.

UEs may access the network also through access networks that may not be setup and maintained by any trusted operator, they may also reside outside the operator's domain. These access technologies are collectively named Non-3GPP access (N3GPP) and they may be so called untrusted N3GPP access if there is no trust relationship between the core network and the access network.

An example network architecture including (R)AN and N3GPP access technologies is depicted in FIG. 1. The figure shows the network elements that provide access to a CN via 3GPP access technologies ((R)AN) and via a Non-3GPP access shown example wise as a wireless local area network (WLAN). The WLAN is an untrusted node example wise providing access to the internet, therefore the WLAN itself cannot directly provide access to nodes inside the core network. The WLAN probably through public internet provides to the UE a connection to a Non-3GPP interworking function (N3IWF). This CN element is specified to allow access to the CN from untrusted N3GPP nodes. It may accumulate multiple untrusted Non-3GPP access networks (only one is shown in FIG. 1). The N3IWF is a device that may be maintained by the operator and may therefore be trusted.

A UE requesting initial access to a network via 3GPP access, e.g. (R)AN, will establish a radio connection to a base station of the (R)AN and transmit a request to register the UE in the network. The UE may provide an initial UE ID, either a permanent or temporary ID in the request. The base station will select an appropriate function of the core network which may be an access and mobility function (AMF). The AMF will contact an authentication server function (AUSF) and a user data management (UDM) to receive subscriber information and authenticate the UE.

A UE requesting initial access to a network via non-3GPP access, e.g. an untrusted non-3GPP access like WLAN and public internet, will first contact an N3IWK to access the core network. The N3IWK will select an AMF and provide a registration request to the AMF. The following authentication of the UE with the AUSF includes establishment of a security association and an IPsec tunnel between UE and N3IWF.

At the end of the registration procedure the access network, either (R)AN or WLAN and N3IWF, has setup a UE-specific connection to the serving AMF. The connection is named N2 and together with the connection over the access network to the UE it is the base for a logical connection between UE and AMF, so called N1 interface as depicted in FIG. 1.

The network element involved in data transfer, e.g. session management function (SMF), user plane function (UPF) and data network (DN) are not described herein because this invention focusses on solution regarding the control plane comprising the above mentioned entities.

FIG. 2 shows a CN architecture in the roaming case, i.e. in the case where a UE accesses a CN that is not its home PLMN. The UE registers at the AMF in the visited network as described above, but the AMF contacts the home network for authentication. The UDM and AUSF in the home network authenticate the UE and create a security context which is transferred to the AMF in the visited network.

In any case, a UE is controlled by a core network node (AMF) of the same network that provides the (R)AN. Thus in roaming case, there is no architecture option that keeps the core network control in the home network.

Again, the network element involved in data transfer are not described herein.

WO 2016/180865 A1 describes handling a UE requesting access to a service via an untrusted non-3GPP network, especially detecting whether the UE is in a roaming scenario or not. The information is used by the network to restrict or allow services via the untrusted N3GPP access. The description assumes a home connection via N3GPP access should be prohibited in some cases, e.g. if the UE is in coverage of a visited network.

In 3GPP document S2-170318 presented at the SA WG2 Meeting #118-bis, it is proposed to have two AMFs serving a UE, one for 3GPP access and one for un-trusted non-3GPP access.

In the state of the art, a UE that is outside the coverage of its home network may have access to the public internet, e.g. via WLAN, and access its home N3IWK. It is thus possible that a UE that has coverage to a visited network registers via non-3GPP access at its home network. The resulting architecture is shown in FIG. 3. The UE is shown without a link to the (R)AN and AMF in the visited network (dashed lines only indicate potential links that are not present). Instead, the UE has a link via WLAN to the home N3IWK and from there to the AMF in the home network, where it is registered.

In this case, the home network may be aware of the location of the UE in the coverage of the visited network or it may not be aware. To be aware, the home network may receive location information from the UE or the N3IWK provides such information based on an analysis of the address of the WLAN access the UE uses.

The UE in this scenario may further request registration in a visited network via a visited (R)AN. According to the state of the art, the home network has no feasible means to influence the access to the visited network. The current standard behaviour of a mobile is to search for a suitable network and once found, request registration.

To prevent the UE from accessing the visited network, the home network could provide the identity of the visited network in the list of forbidden PLMNs (public land mobile networks) to the UE. As a result, the UE will never access the visited network until that list is changed. If the UE moves out of WLAN coverage, no access attempt to the visited network would be made and the UE is lost, thus forbidding the visited PLMN based on the UE location is not a feasible option to control the visited access and no other means exist.

GENERAL DESCRIPTION

It is thus an objective of the current invention to provide more sophisticated control mechanisms to the home network and to the UE for the decision to access the visited network.

If the UE requests registration via (R)AN to the visited network, the UE will provide its temporary identity to (R)AN in the visited network. The temporary ID was received from the home network while registering via N3GPP access. The (R)AN will select an AMF in the visited network and forward the registration request. The AMF in the visited network will contact the AMF in the home network, identified by the provided temporary UE identification, to request provisioning of the UE context and handover of the UE control.

According to the prior art, the AMF in the visited network will take over control of the UE from the AMF in the home network. The legacy use case for this is mobility of the UE across the boarder from the home to the visited network and resulting handover.

The currently looked at use case is different and requires different solutions. The only way to prevent the handover of the control for the home network is to reject the context transfer by the AMF in the home network with an appropriate reasoning. The rejection towards the AMF in the visited network will lead to a rejection of the registration request to the UE also with the cause included so that the UE will act depending on the reject cause provided.

In the known arrangements, the UE may mark that network as forbidden and not request access again until the UICC is removed or the UE is powered down. This is the case when e.g. the cause is "illegal UE". Alternatively, the UE may treat the network access to be prohibited for a certain time interval. After a timer expires, the next access request may be placed by the UE, e.g. when the cause is "temporary network congestion". Other reasons indicate the current cell or tracking area to be inappropriate to access the network, which may allow the UE to access from a different cell or tracking area depending on the UE mobility.

The home network cannot configure the UE with access conditions based on the N3GPP access to the home network, i.e. to prohibit access to the visited network as long as the N3GPP access to the home network exists or fulfils certain conditions.

It is thus another objective of this invention to provide means to the home network to reject handover of control of a UE to a visited network based on a N3GPP access to the home network while providing the UE with a configuration to only access the visited network again when the N3GPP access dropped or it is released.

The present invention provides a method performed by a home public land mobile network, PLMN, of controlling access of a user equipment, UE, device to a non-home PLMN when the UE device has an access to a non-trusted network and thereby a connection with the home PLMN via an interworking function entity, the method comprising in the event of the UE device requesting an attachment to the non-home PLMN, making in the home PLMN a decision as to whether control of the UE device should be handed over to the non-home PLMN; and communicating the decision to the non-home PLMN.

In a further aspect, the invention provides a user equipment, UE, device adapted to establish a connection with a home public land mobile network, PLMN, via a non-trusted network, wherein the UE device is further adapted to request a connection with a non-home PLMN while connected to the home PLMN via the non-trusted network and is responsive to a rejection message received from the non-home PLMN.

The invention also provides a public land mobile network, PLMN, acting as a home PLMN to a user equipment, UE, device and being arranged to control access of the UE device to a non-home PLMN when the UE device has an access to a non-trusted network and thereby a connection with the home PLMN via an interworking function entity, the home PLMN being configured in the event of the UE device requesting an attachment to the non-home PLMN to make a decision as to whether control of the UE device should be handed over to the non-home PLMN; and to communicate the decision to the non-home PLMN.

In one aspect the invention provides a user equipment, UE, device which may be connected to a home network over a non-3GPP access providing to the home network location information identifying the presence of the UE outside the coverage area of a radio access network of the home network and in the coverage area of a radio access network of a second network, the UE receiving from the home network configuration information prohibiting an access to the second network for at least one service as long as the connection to the home network is established, the UE in reply to detecting the connection to the home network is lost, requesting connection to the second network through the radio access network of the second network.

The invention further provides a UE which may be connected to a home network over a non-3GPP access; the UE requesting to attach to a visited network over a radio access network of the visited network; the UE receiving a rejection of the request to attach to the visited network and receiving an information that a further request to attach to the visited network is prohibited at least for one service as long as the connection to the home network is established, the UE in reply to detecting the connection to the home network is lost, requesting to attach to the second network through the radio access network of the second network.

The invention provides in a public land mobile network, PLMN, in particular a home PLMN a node in the home network of a UE having UE context information and an active connection to the UE over non-3GPP access, the node receiving a request to provide the UE context information and to handover the control of the UE to a visited network, the node rejecting the request, potentially with reference to the existing active connection, and providing information to the UE or to the visited network that a further request to attach to the visited network is prohibited at least for one service as long as the connection to the home network is established.

The node may receive a further request to provide the UE context information and to handover the control of the UE to a visited network; the node determining that the request comprising information about a loss of a connection between the UE and the node; and the node providing the UE context information and handing over the control of the UE to the visited network.

BRIEF DESCRIPTION OF THE DRAWINGS

Preferred embodiments will now be described, by way of example only, with reference to the accompanying drawings in which.

DETAILED DESCRIPTION

Figure 1:
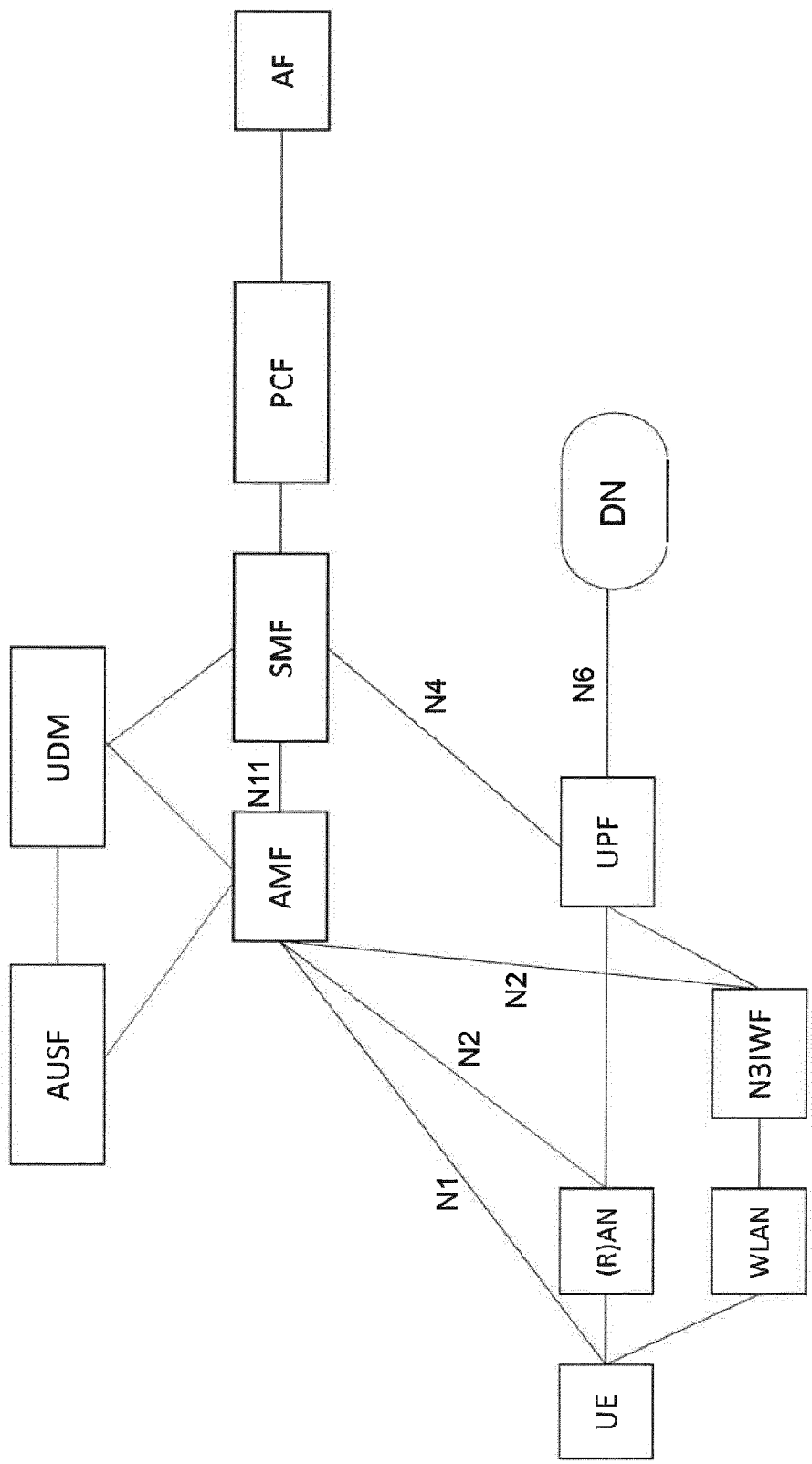
FIG. 1 is a schematic diagram of a UE connected to a non-3GPP network and a PLMN.
Figure 2:
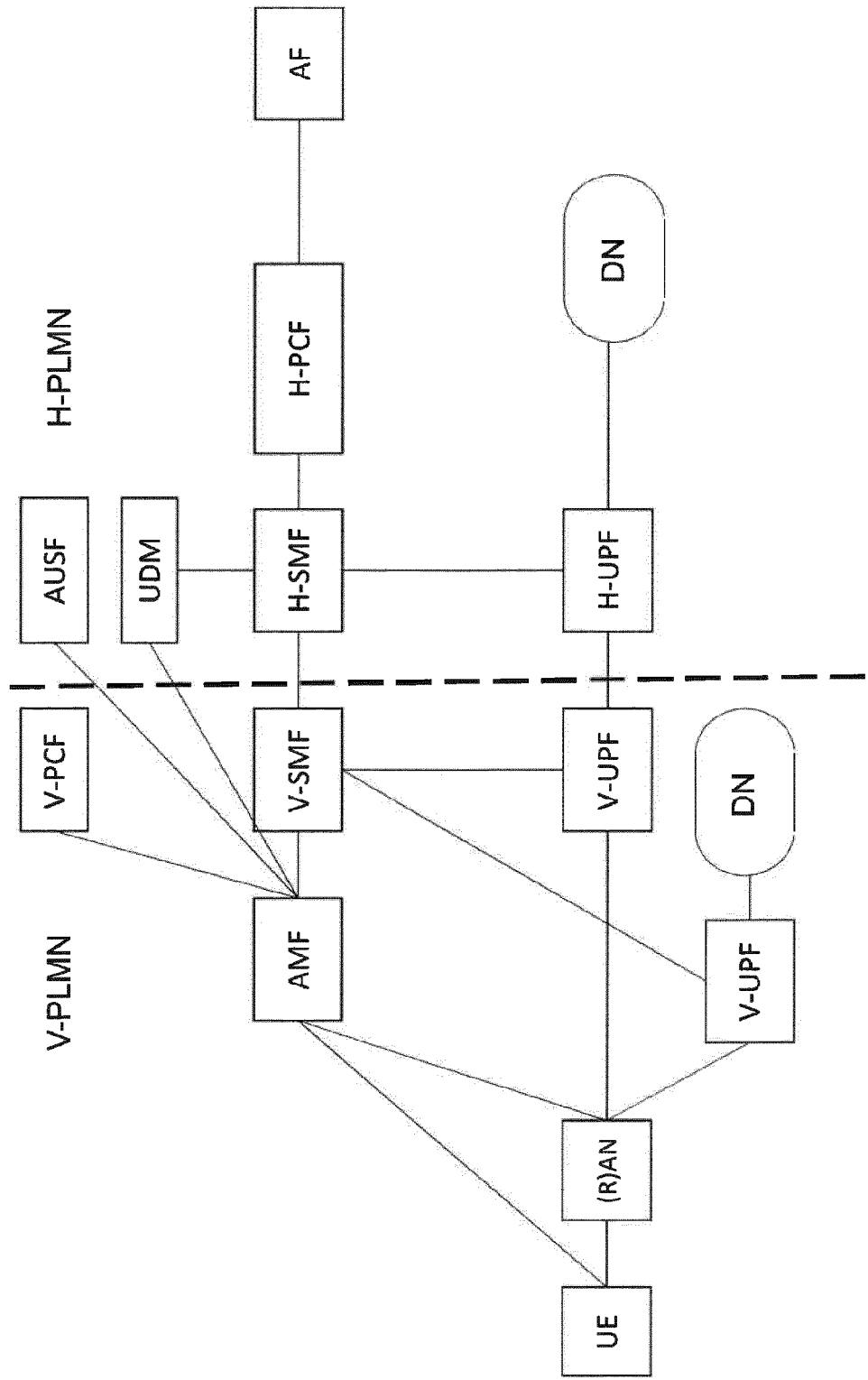
FIG. 2 shows a UE connected to a visited PLMN which is in communication with a home PLMN.
Figure 3:
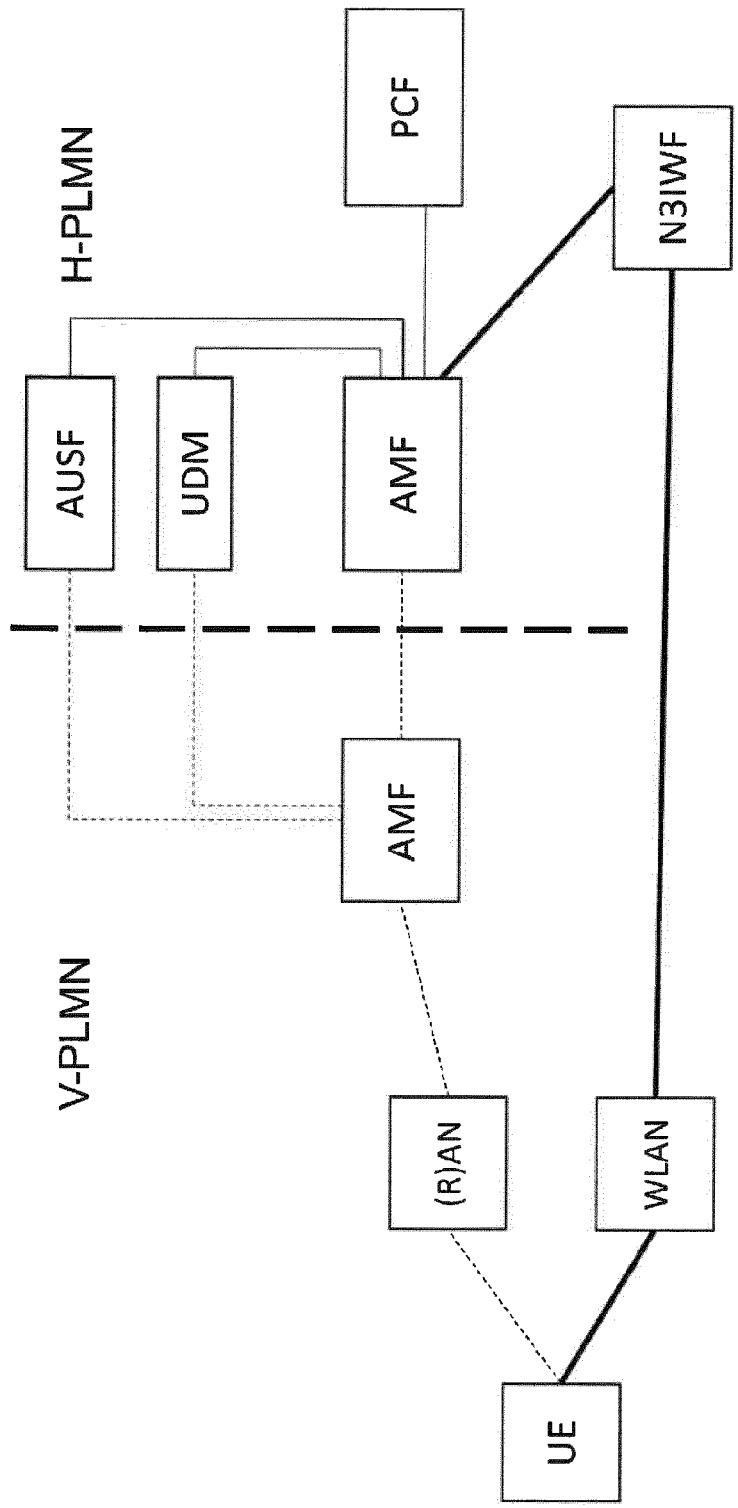
FIG. 3 shows a UE connected via a non-3GPP network to its home PLMN and a possible connection to a visited PLMN.

Referring to FIG. 3 there are shown control functions of a simplified roaming architecture of two cellular mobile networks, a home PLMN H-PLMN and a visited PLMN V-PLMN. A UE resides in an area that is generally covered by the V-PLMN cellular mobile network which is not the home network of the UE. The UE is not connected to that network; dashed lines indicate theoretical links that are not present according to a current situation.

The UE is connected to a non-3GPP access system, in this example shown as a WLAN. The WLAN may offer access to public Internet so that the UE can connect to the N3IWF of its home network. The UE is assumed to be attached to the home network via N3IWF and thus have a N1 connection to an AMF of the home network. The AMF is connected to the authentication server function (AUSF) for authentication of the UE and to the user data management (UDM) to receive and store subscriber data. A connection to the policy control server PCF provides rules for UE and network related decisions about quality and type of service a UE may be provided with.

FIG. 3 also shows a visited network V-PLMN to which the UE is currently not attached. The visited network provides a radio access network (R)AN that is a trusted 3GPP access network and an AMF. The AMF is able to connect to the home network to request handover of a connection between UE and AMF in the home network and to authenticate the UE with the AUSF and request subscriber information from the UDM.

Figure 4:
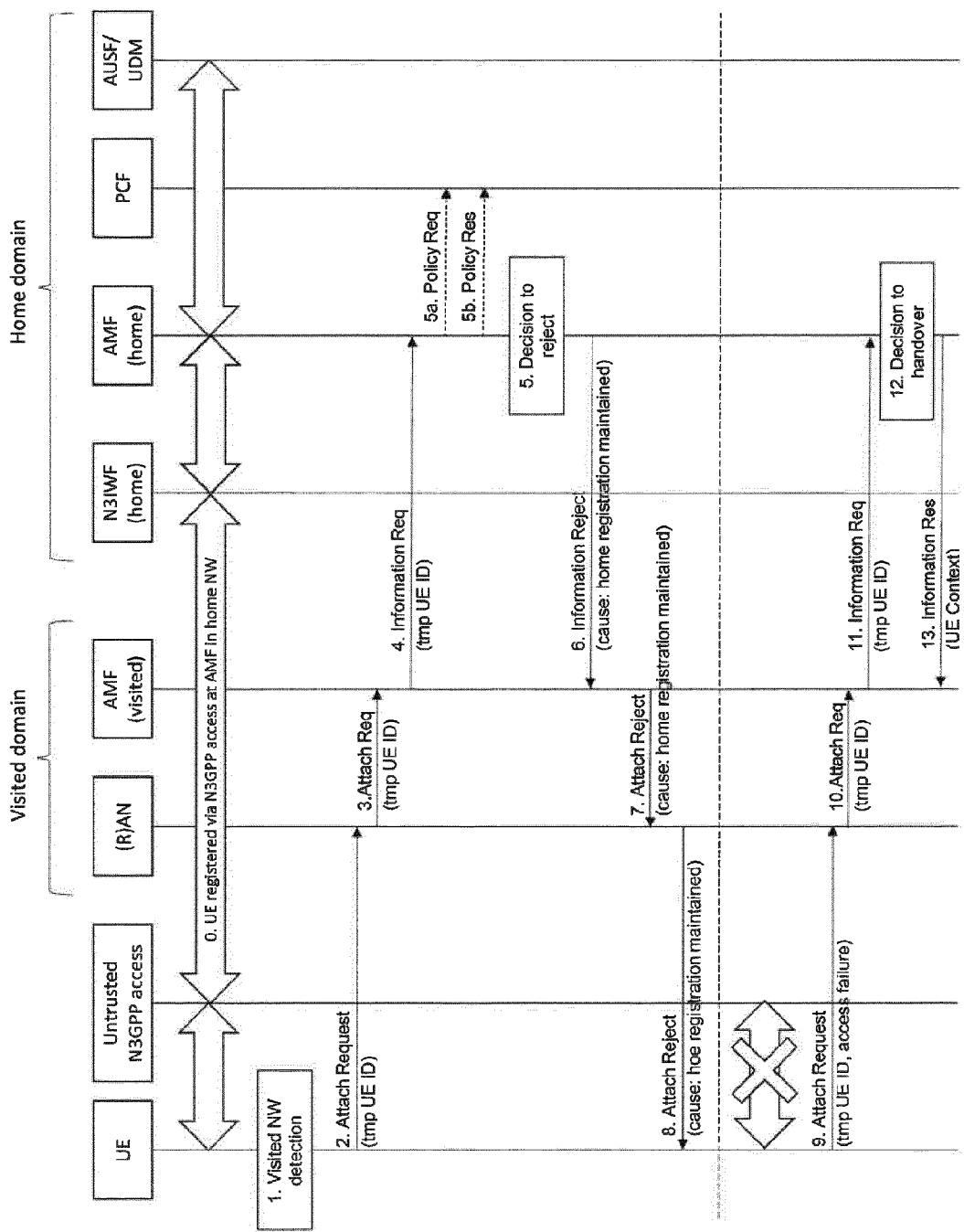
FIG. 4 is a message flow chart showing a UE connected to a non-3GPP network requesting access to a visited PLMN.

FIG. 4 shows an exemplary embodiment of the invention. As a prerequisite, the UE is connected to an untrusted non-3GPP access network like the WLAN in FIG. 3. Also, the UE is attached to its home network via the non-3GPP access and an N3IWF. The UE has a connection to an AMF in the home network, the UE is authenticated by the AUSF. The pre-requisite is shown in FIG. 4 as step 0.

While the UE is accessing its home network through N3GPP access, the UE detects the visited network in step 1 and the cellular modem starts to attach to that network according to the 3GPP standard. The UE transmits an Attach Request in step 2 providing its temporary ID that it received from the home network during registration. The Attach Request may be transmitted within a message of lower layer protocol like the Radio Resource Control protocol between UE and the base station of the (R)AN. FIG. 4 only shows the messages relevant to this invention.

The (R)AN will select an appropriate AMF in the same network and forward the Attach Request message to that AMF in step 3. The AMF is informed by the nature of the UE identity being a temporary UE identity, that the UE is currently attached to another network. The network name or address as well as the name or address of the AMF within the network are encoded in the temporary UE identity so that the AMF in the visited network can request handover of the UE control from the respective AMF in the home network. This is done with an Information Request message in step 4.

In a legacy system, the AMF in the home network would transmit the complete UE context in an Information response and the AMF in the visited network would start to take over control. After the AMF in the visited network acknowledges the handover, the AMF in the home network could delete the UE context.

According to this invention, the AMF in the home network makes a decision whether to handover control of the UE to the visited network or to keep the control at least as long as the non-3GPP access is available. The decision may be based on various parameters, examples are:

i) whether the non-3GPP access can be maintained under control of the visited network, i.e. whether the AMF in the visited network is capable to maintain the N3GPP connection. This may be based on capability information received from the AMF in the visited network, e.g. in the Information Request message;

ii) the quality and type of the current non-3GPP connection. The type could differentiate the technology used, e.g. fixed access, the sub-standard from the WLAN 802.11 family, the frequency band used, especially preferring lower frequencies as they provide wider and more stable coverage, use of MIMO etc.; and iii) policies from the network related to current home network load, UE device-specific policies, policies based on the N3GPP access identification etc. The policies may be requested by the AMF from a respective policy control server (PCF) in steps 5*a/b*.

Assuming the AMF decided to reject the handover of control, it is one important aspect of this invention to reject the request while providing a reason cause that indicates to the UE that the UE is allowed in the visited network in general, but the current request is rejected with reference to the existing connection over non-3GPP access. Step 6, 7 and 8 in FIG. 4 show the rejection messages being passed from the AMF in the home network to AMF in the visited network and from there via the (R)AN to the UE. The respective messages are shown to contain the rejection cause "home registration maintained".

According to this embodiment, the UE refrains from accessing the network again as long as the N3GPP access to the home network is maintained. This is a result of the new rejection cause that expresses a conditional prohibition to access the visited network based on the existing N3GPP access.

The UE may however camp on a cell of the visited network in order to use the network for emergency calls. In case of an emergency call, the UE will request an emergency attach which can be treated differently in the visited network and which will not be rejected. It may also be that there is an information included in the Attach rejection that configures whether the UE should first attempt to place emergency calls over the non-3GPP access and only in case of failure use the visited network or whether the visited network will be directly used for emergency calls.

Other from emergency calls, the UE will only communicate over the non-3GPP access.

In an alternative embodiment the home network provides more detailed information to the UE about which services to be setup by the UE may trigger an attachment to the visited network and which may not. It can then be configured by the home network that various services (not only emergency service) can trigger a handover of control to the visited network but other service should not.

Assuming now that after a while (some time elapsing is indicated by a dashed horizontal line in FIG. 4) the connection over the non-3GPP access to the home network breaks. This may be due to movement of the UE outside the coverage of a WLAN access point or due to network overload between WLAN and N3IWF.

The UE detects the break and immediately starts a new attempt to attach to the visited network. This attempt may according to this invention comprise the information that a former non-3GPP access was lost. The request and this loss information is passed to AMF in the visited network and the AMF in the home network is requested to handover control of the UE.

If the AMF in the home network already detected the break of the connection to the UE, the home network will now decide to handover the control and perform with a legacy steps as depicted in steps 11 and 13.

It may also be that the AMF in the home network did not detect the break of the connection, especially when the reason for the break is a lost WLAN connection. In that case the UE will detect the loss much faster than the home network. For that case the information provided by the UE in the attach request about the lost former connection is transferred to the AMF in the home network in step 11 so that the AMF can base its decision on the most current state of its connection to the UE.

The above is one embodiment of the invention. In summary, the home network rejects a request to handover control of a UE to a visited network and informs the UE to try again when (or not try before) a current connection is released.

An alternative embodiment of the invention configures the UE from the home network while connected over non-3GPP access to only access a visited network for emergency services or when the connection to the home network is lost. In that case the UE would not make an attempt to access the network (steps 1 to 8 of FIG. 4 omitted). The UE may then perform a usual cell selection to camp on a suitable cell as preparation for an emergency call. It may also send the cellular radio or modem to a longer sleep circle or to a power off mode assuming that as long as the non-3GPP connection lasts the UE has not moved much and the last found cell still allows a fast connection setup.

Such a configuration of the UE may be received from the AMF in the home network during or after the attach of the UE when the networks learns that the UE is in coverage of a visited network. This information may be send by the UE either explicitly as a location, e.g.

GPS position, or as information about a detected network, e.g. country and network code from the detected strongest cell. The network in reply may configure the UE not to access the network in order to keep the control by the home network. As stated above, alternatively the home network configures services for which an attach at the visited network is allowed and services for which it is not.

The invention claimed is:

1. A method performed by a home network of controlling attachment of a user equipment, UE, device to a non-home network when the UE device has an access to a non-3GPP network and thereby a connection with the home network via an interworking function entity, the method comprising:
    in the event of the UE device requesting an attachment to the non-home network, making in the home network a decision as to whether the attachment to the non-home network by the UE device should be rejected; and
    communicating the decision to the non-home network, wherein the home network communicates to the non-home network a message that the UE device's request is rejected, the message further indicating that a further request for attachment to the non-home network by the UE device is prohibited for at least one service while the connection with the home network is established so as to cause the UE device to refrain from requesting attachment to the non-home network for the at least one service as long as the connection to the home network via the interworking function entity is maintained.

2. The method according to claim 1, wherein the home network when making the
    decision, takes into account at least one of a quality of the non-3GPP network access, a type of the non-3GPP network access and one or more policies of the home network.

3. The method according to claim 1, wherein the UE device, when requesting an attachment to the non-home network, provides to the non-home network connection information about the established connection to the home network, the non-home network provides the connection information to the home network and the making a decision as to whether the attachment to the non-home network by the UE device should be rejected is based on the connection information.

4. The method according to claim 1, wherein the message further indicates at least one service to be setup by the UE device for which further requests for attachment are allowed.

5. A mobile network, acting as a home network to a user equipment, UE, device and being arranged to control attachment of the UE device to a non-home network when the UE device has an access to a non-3GPP network and thereby a connection with the mobile network via an interworking function entity, the mobile network being configured to:
receive from the non-home network information about the UE device requesting an attachment to the non-home network,
make a decision as to whether the attachment to the non-home network by the UE device should be rejected; and
communicate the decision to the non-home network,
wherein the mobile network is configured to communicate to the non-home network a message that the UE device's request is rejected, the message further indicating that a further request for attachment to the non-home network by the UE device is prohibited for at least one service while the connection with the mobile network is established so as to cause the UE device to refrain from requesting attachment to the non-home network for the at least one service as long as the connection to the mobile network via the interworking function entity is maintained.

6. The mobile network according to claim 5, wherein the mobile network is configured when making the decision to take into account at least one of a quality of the non-3GPP network access, a type of the non-3GPP network access, one or more policies of the mobile network and information received from the non-home network about the connection of the UE device with the mobile network.

7. The mobile network according to claim 6, wherein the type of the non-3GPP network access includes at least one of a fixed access, the sub-standard of a wireless local area network (WLAN) standard family, and the frequency range used.

8. The mobile network according to claim 6, wherein the message further indicates at least one service to be setup by the UE device for which further requests for attachment are allowed.

9. A user equipment, UE, device adapted to establish a connection with a home network via a non-3GPP network, wherein the UE device is further adapted to request a connection with a non-home network while connected to the home network via the non-3GPP network by means of a request message, the request message comprising information that the connection to the home network via the non-3GPP network is established and is adapted to receive from the non-home network a rejection message informing the UE device that further requests for attachment to the non-home network are prohibited for at least one service while the connection with the home network is established,
the UE device being responsive to the rejection message received from the non-home network by performing at least one of:
refraining from requesting a connection with the non-home network as long as the connection to the home network via the non-3GPP network is maintained;
connecting to the non-home network for certain services but not others; and
camping on a cell of the non-home network so as to enable a making of an emergency call by means of an emergency attach procedure.

10. The UE device according to claim 9, wherein the UE device is arranged to request a connection to the non-home network in an event of the connection to the home network via the non-3GPP network being lost.

11. The UE device according to claim 9, wherein the rejection message further indicates at least one service to be setup by the UE device for which further requests for attachment are allowed.

12. A mobile network acting as a home network to a user equipment, UE, device and being arranged to control access of the UE device to a non-home network when the UE device has an access to a non-3GPP network and thereby a connection with the home network via an interworking function entity, the home network being configured to, in reply to receiving from the UE device information indicating the UE device is in coverage of a radio access network of the non-home network, provide configuration information for the UE device, the configuration information indicating that a request for attachment to the non-home network by the UE device is prohibited for at least one service while the connection with the home network is established so as to cause the UE device to refrain from requesting attachment to the non-home network for the at least one service as long as the connection to the home network via the interworking function entity is maintained.

13. The mobile network according to claim 12, wherein the information indicating the UE device is in coverage of a radio access network of the non-home network is at least one of a detection of a signal received from the access network of the non-home network, an information received from the access network of the non-home network and location information regarding the position of the UE device.

14. The mobile network according to claim 13, wherein the configuration information further indicates at least one service to be setup by the UE device for which further requests for attachment are allowed.

15. A user equipment, UE, device adapted to establish a connection with a home network via a non-3GPP network, wherein the UE device is further adapted:
to transmit to the home network information indicating the UE device is in coverage of a radio access network of a non-home network,
to receive from the home network configuration information, the configuration information indicating that a request for attachment to the non-home network by the UE device is prohibited for at least one service while the connection with the home network is established so as to cause the UE device to refrain from requesting attachment to the non-home network for the at least one service as long as the connection to the home network via an interworking function entity is maintained, and
in reply to the UE device detecting a loss of the connection with the home network, to request attachment to the non-home network.

* * * * *